(12) United States Patent
Fukuda

(10) Patent No.: US 11,691,074 B2
(45) Date of Patent: Jul. 4, 2023

(54) PROGRAM, SERVER APPARATUS, AND GAME SYSTEM

(71) Applicant: GREE, Inc., Tokyo (JP)

(72) Inventor: Satoshi Fukuda, Tokyo (JP)

(73) Assignee: GREE, Inc., Tokyo (JP)

( * ) Notice: Subject to any disclaimer, the term of this patent is extended or adjusted under 35 U.S.C. 154(b) by 0 days.

(21) Appl. No.: 17/705,698

(22) Filed: Mar. 28, 2022

(65) Prior Publication Data
US 2022/0219079 A1    Jul. 14, 2022

Related U.S. Application Data

(63) Continuation of application No. 16/914,898, filed on Jun. 29, 2020, now Pat. No. 11,318,381, which is a
(Continued)

(30) Foreign Application Priority Data

Sep. 13, 2016  (JP) .................................. 2016-178262

(51) Int. Cl.
*A63F 13/35* (2014.01)
*A63F 13/25* (2014.01)
(Continued)

(52) U.S. Cl.
CPC .............. *A63F 13/35* (2014.09); *A63F 13/25* (2014.09); *A63F 13/32* (2014.09); *A63F 13/335* (2014.09); *A63F 13/795* (2014.09)

(58) Field of Classification Search
CPC ........ A63F 13/25; A63F 13/32; A63F 13/335; A63F 13/35; A63F 13/795
See application file for complete search history.

(56) References Cited

U.S. PATENT DOCUMENTS 8,715,091 B1    5/2014    Hashimoto et al.
8,827,788 B2    9/2014    Takagi et al.
(Continued)

FOREIGN PATENT DOCUMENTS

JP      2013-111399 A    6/2013
JP      2015-8918 A      1/2015
(Continued)

OTHER PUBLICATIONS

Office Action dated Jun. 20, 2017 of corresponding Japanese application No. 2017-026833; 22 pgs.
(Continued)

*Primary Examiner* — Seng H Lim
(74) *Attorney, Agent, or Firm* — Maier & Maier, PLLC

(57) ABSTRACT

A server apparatus, which may be configured to execute a step of storing one or more first game content associated with a plurality of users, a step of selecting two or more users from among the plurality of users, an establishment step of establishing association between each user and a second game content, and a step of executing a first game part on the basis of the second game content of which association with each user may be established and a user operation on the terminal device used by each user. The second game content associated with the first user among the two or more users may be selected from among one or more first game content associated with the first user and one or more first game content associated with the second user among the two or more users.

20 Claims, 10 Drawing Sheets

Related U.S. Application Data continuation of application No. 15/701,974, filed on Sep. 12, 2017, now Pat. No. 10,737,173.

(51) Int. Cl.
    *A63F 13/32*     (2014.01)
    *A63F 13/335*     (2014.01)
    *A63F 13/795*     (2014.01)

(56) References Cited

U.S. PATENT DOCUMENTS

| | | |
|---|---|---|
| 9,589,292 B1 | 3/2017 | Harcar |
| 9,630,092 B2 | 4/2017 | Yamaguchi et al. |
| 9,770,656 B2 | 9/2017 | Nishimura |
| 10,328,337 B1 | 6/2019 | Wakeford et al. |
| 2004/0162136 A1 | 8/2004 | Yamato et al. |
| 2005/0137015 A1 | 6/2005 | Rogers et al. |
| 2005/0151320 A1 | 7/2005 | Gress |
| 2007/0202951 A1 | 8/2007 | Bogosian et al. |
| 2008/0220876 A1 | 9/2008 | Mehta et al. |
| 2009/0210324 A1 | 8/2009 | Bhogal et al. |
| 2011/0053693 A1 | 3/2011 | Wright |
| 2013/0059663 A1 | 3/2013 | Kurlancheek et al. |
| 2013/0337906 A1 | 12/2013 | Ikeda |
| 2014/0066199 A1 | 3/2014 | Takagi et al. |
| 2014/0274401 A1 | 9/2014 | Oono |
| 2015/0017611 A1 | 1/2015 | Moumneh |
| 2015/0148131 A1 | 5/2015 | Owaku et al. |
| 2015/0209672 A1 | 7/2015 | Otomo |
| 2015/0248819 A1 | 9/2015 | Uhren et al. |
| 2015/0265918 A1 | 9/2015 | Yamaguchi et al. |
| 2016/0101364 A1 | 4/2016 | Hanaki et al. |
| 2016/0114244 A1 | 4/2016 | Nishimura |
| 2017/0021274 A1 | 1/2017 | Vonderhaar |
| 2017/0270601 A1 | 9/2017 | Nakano |

FOREIGN PATENT DOCUMENTS

| | | |
|---|---|---|
| JP | 5833789 B1 | 12/2015 |
| JP | 2016-5569 A | 1/2016 |
| JP | 5909585 B1 | 4/2016 |
| JP | 6096973 B1 | 3/2017 |
| JP | 6930945 B2 | 9/2021 |

OTHER PUBLICATIONS

Yamaneko Inc., "SE-MOOK Final Fantasy Crystal Chronicle Echoes of Time Official Complete Guide," Square Enix Co., Ltd., Mar. 19, 2009, First Edition First Printing, pp. 12-13, 16-24, and 48-50.

Miori, Kazumasa et al., "Biohazard / Dark Side Chronicles Official Guidebook", Enterbrain, Inc., Mar. 9, 2010, First Edition, p. 011.

Office Action dated Aug. 18, 2018 of corresponding Japanese application No. 2018-127026; 11 pgs.

Office Action dated Sep. 13, 2020 in connection with corresponding Japanese Patent Application No. 2021-131510, 4 pages.

FIG.2

| CHARACTER ID | CHARACTER NAME | EQUIPMENT TYPE | DEGREE OF RARENESS | LEVEL | HP | ATTACK POWER | DEFENSE POWER | ATTRIBUTE | SKILL |
|---|---|---|---|---|---|---|---|---|---|
| **** | CHARACTER A | SWORD | 1 | 1 | 100 | 110 | 120 | FIRE | **** |
| **** | CHARACTER B | SPEAR | 2 | 1 | 130 | 140 | 150 | WATER | **** |
| **** | CHARACTER C | GUN | 3 | 1 | 160 | 170 | 180 | WOOD | **** |
| ... | ... | ... | ... | ... | ... | ... | ... | ... | ... |

FIG.3

| ITEM ID | ITEM NAME | ITEM TYPE | DEGREE OF RARENESS | LEVEL | HP | ATTACK POWER | DEFENSE POWER | ATTRIBUTE | SKILL |
|---|---|---|---|---|---|---|---|---|---|
| **** | ITEM A | SWORD | 1 | 1 | 10 | 11 | 12 | – | **** |
| **** | ITEM B | SWORD | 2 | 1 | 13 | 14 | 15 | – | **** |
| **** | ITEM C | SWORD | 3 | 1 | 16 | 17 | 18 | FIRE | **** |
| ... | ... | ... | ... | ... | ... | ... | ... | ... | ... |

FIG. 4

| USER ID | FIRST GAME MEDIUM | SECOND GAME MEDIUM | HISTORY INFORMATION |
|---|---|---|---|
| USER A | **** | **** | **** |
| USER B | **** | **** | **** |
| USER C | **** | **** | **** |
| ... | ... | ... | ... |

FIG. 5

| FIRST GAME PART ID | ADVANTAGEOUS ITEM TYPE | ADVANTAGEOUS ATTRIBUTE | GAME DATA |
|---|---|---|---|
| FIRST GAME PART A | SWORD | FIRE | **** |
| FIRST GAME PART B | SPEAR | WATER | **** |
| FIRST GAME PART C | GUN | WOOD | **** |
| ... | ... | ... | ... |

PROGRAM, SERVER APPARATUS, AND GAME SYSTEM

CROSS-REFERENCE TO RELATED APPLICATIONS

This application claims priority from U.S. patent application Ser. No. 16/914,898, filed on Jun. 29, 2020, entitled "Program, server apparatus, and game system," which in turn claims priority to U.S. patent application Ser. No. 15/701,974, now U.S. Pat. No. 10,737,173, filed on Sep. 12, 2017, which in turn claims priority to Japanese Patent Application No. JP2016178262A, filed on Sep. 13, 2016, the entire contents of which are hereby incorporated by reference.

BACKGROUND OF THE INVENTION

Field of the Invention

The invention relates to a program, a server apparatus, and a game system.

Description of the Related Art

In the related art, in a game executed by an information processing device, a multi-player configuration where a game progresses in response to operations by a plurality of users is known. For example, Japanese Patent No. 5833789 discloses a cooperative multi-player configuration where a plurality of users cooperatively play a battle against a common enemy character.

In games in the related art, a multi-player configuration where a plurality of users simultaneously play and a single-player configuration where the user plays alone are known. For example, a game with a multi-player configuration is appropriate for activating communication between users. Therefore, it is desirable to give the users a motivation for performing a multi-player mode.

SUMMARY OF THE INVENTION

The invention made in view of such circumstances is to provide a program, a server apparatus, and a game system that give a user a motivation for performing multi-player in a game employing a multi-player configuration.

According to an exemplary embodiment, there may be provided a program which may cause a server apparatus providing a game to a plurality of terminal devices used by a plurality of users to execute: a step of storing one or more first game content associated with a user for each of the plurality of users; a selection step of selecting two or more users from among the plurality of users; an establishment step of establishing association between the user and a second game content for each of the two or more users; and a step of executing a first game part common to the two or more users on the basis of the second game content of which association with each of the two or more users may be established and a user operation for the two or more terminal devices used by the two or more users, wherein the second game content associated with the first user among the two or more users in the establishment step may be a game content selected from among one or more first game content associated with the first user and one or more first game content associated with the second user among the two or more users.

According to another exemplary embodiment, there may be provided a server apparatus providing a game to a plurality of terminal devices used by a plurality of users, including: a storage unit which may store one or more first game content associated with a user for each of the plurality of users; and a control unit, wherein the control unit: may select two or more users from among the plurality of users; may execute an establishment process for establishing association between the user and a second game content for each of the two or more users; and may execute a first game part common to the two or more users on the basis of the second game content of which association with each of the two or more users may be established and a user operation for the two or more terminal devices used by the two or more users, and wherein the second game content associated with the first user among the two or more users in the establishment process may be a game content selected from among one or more first game content associated with the first user and one or more first game content associated with the second user among the two or more users.

According to still another exemplary embodiment, there may be provided a game system including: a plurality of terminal devices respectively used by a plurality of users; and a server apparatus providing a game to the plurality of terminal devices, wherein the server apparatus: may store one or more first game content associated with a user for each of the plurality of users; may select two or more users from among the plurality of users; and may execute an establishment process for establishing association between the user and a second game content for each of the two or more users, wherein each of the terminal devices used by the two or more users may transmit information based on a user operation on the terminal device to the server apparatus, wherein the server apparatus may execute a first game part common to the two or more users on the basis of the second game content of which association with each of the two or more users may be established and the information received from each of the terminal devices, and wherein the second game content associated with the first user among the two or more users in the establishment process may be a game content selected from among one or more first game content associated with the first user and one or more first game content associated with the second user among the two or more users.

According to a program, a server apparatus, and a game system according to embodiments of the invention, it may be possible to give a user a motivation for performing multi-player.

BRIEF DESCRIPTION OF THE DRAWINGS

FIG. 2 is a diagram illustrating information on characters;

FIG. 3 is a diagram illustrating information on items;

FIG. 4 is a diagram illustrating information on a user;

FIG. 5 is a diagram illustrating information on a first game part;

DETAILED DESCRIPTION OF THE INVENTION

Hereinafter, a number of exemplary embodiments may be described.

Figure 1:
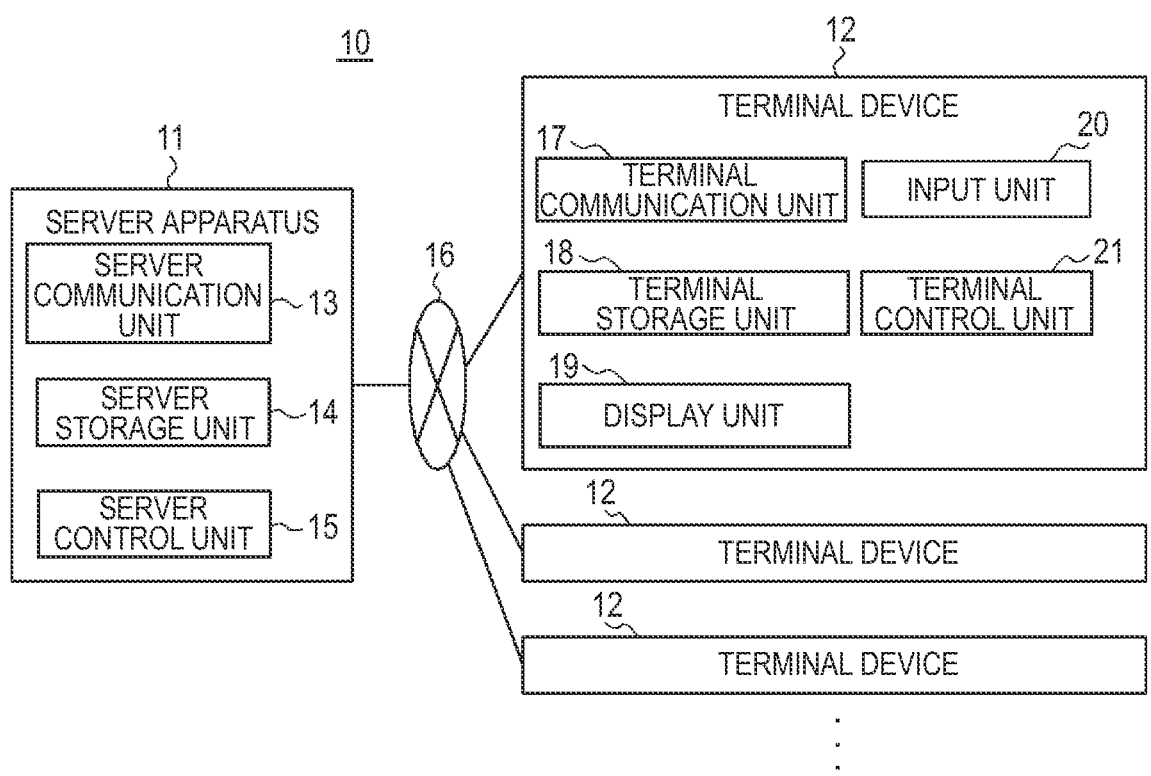
FIG. 1 is a block diagram illustrating a game system according to an embodiment of the invention.

First, a game system 10 according to an embodiment of the invention will be described with reference to FIG. 1. The game system 10 may be configured to include a server apparatus 11 and a plurality of terminal devices 12. Three of the plurality of terminal devices 12 are illustrated in FIG. 1 for the convenience, but the number of terminal devices 12 may be two or more.

The server apparatus 11 may be, for example, an information processing device such as a server that may be to be managed by a game manager. The server apparatus 11 provides a game (game data) to the terminal device 12 that may be to be used by each user. In addition, the terminal device 12 may be an information processing device such as a mobile phone, a smartphone, a tablet terminal, a PC, a game device, or the like. The terminal device 12 may execute the game provided from the server apparatus 11. In this manner, the server apparatus 11 and the terminal device 12 cooperatively control the game that may be provided to the user of the terminal device 12.

Herein, the outline of the game according to the embodiment will be described. The game according to the embodiment may be a game in which a user can play various game parts. At least a portion of the various game parts are executed using by a game content.

The game content may be an electronic data that may be used for a game, and the game content may include, for example, an arbitrary medium such as a card, an item, a ticket, a character, and an avatar. In addition, the game content may be an electronic data that can be acquired, owned, used, managed, exchanged, combined, strengthened, sold, discarded, donated, or the like in the game by the user, but the game content may not be limited to the game content that may be specified in this specification.

Hereinafter, unless otherwise stated, a "game content owned by a user" denotes a game content associated with a user ID uniquely identifying the user as a first game content. Moreover, the phrase "to assign a game content to a user" denotes a step of associating a game content with a user ID as a first game content. In addition, the phrase "to discard a game content owned by a user" denotes a step of associating between a user ID and a first game content. In addition, the phrase "to consume a game content owned by a user" denotes generating some effect or influence in a game according to cancellation of association between a user ID and a first game content. In addition, the phrase "to sell a game content owned by a user" denotes canceling association between a user ID and a first game content and associating another game content (for example, a virtual coin, an item, or the like) with the user ID as a first game content. In addition, the phrase "to transfer a game content owned by a user A to a user B" denotes canceling association between a user ID of a user A and a first game content and to associate the game content with a user ID of a user B as a first game content.

A game part may be a content that the user can play in a game, and a game part may include, for example, a quest, a mission, a mini game, a game content that is acquired, a virtual space search event, and a battle event against an opponent (for example, another user, an enemy character, an enemy building, or the like) and other events. For example, in a case where it may be determined that one or more predetermined conditions (game tasks) set for each game part has been successfully achieved, a predetermined reward such as a game content and a virtual coin may be assigned to the user. An arbitrary task corresponding to the content of the game part, such as a task of winning a battle against an enemy character and a task of reaching a goal point in a virtual space can be employed as the game tasks. In addition, achieving a specific task (complete task) among one or more game tasks set in the game part may also be referred to as clearing the game part. In other words, in a case where the complete task may be successfully achieved in the game part, it may be determined that the game part is cleared, and the game part may be ended.

In the embodiment, the game part may include a game part for single-player and a game part for multi-player. The game part for single-player may be a game part (for example, a game part for one person) that may be executed on the basis of user operation on one terminal device 12 used by one user. One terminal device 12 alone may execute the game part for single-player, or one terminal device 12 and the server apparatus 11 cooperatively execute the game part for single-player. On the other hand, the game part for multi-player may be a game part that may be executed on the basis of user operations on two or more terminal devices 12 used by two or more users and may be common to the two or more users (for example, a game part for a plurality of persons) and. The game part that may be common to that two or more users may be, for example, a game part to which at least a portion of the progress processing, the processing result, and the like of the game part may be commonly applied to the two or more users. The two or more terminal devices 12 cooperatively execute a game part for multi-player, or the two or more terminal devices 12 and the server apparatus 11 cooperatively execute a game part for multi-player.

Hereinafter, the game part for multi-player may also be referred to as a first game part. In the embodiment, the first game part may be a game part in which, for example, up to three users cooperatively play a battle against a common opponent.

As an outline, in the game according to the embodiment, each of the two or more users who play the first game part plays the game part by using one of the two types of game content. The two types of game content are, for example, characters and items that are provided to the characters. Each of the two or more users may select a character to use from among the characters owned by each of the two or more users. On the other hand, each of the two or more users can select an item to be used by the user from among items owned by the user and items owned by other users. Namely, each of the two or more users who play the first game part can borrow an item owned by another user to play the first game part. According to such a configuration, since a user has an opportunity to use an item unowned by the user through the first game part for multi-player, the user can be given a motivation for multi-player.

(Configuration of Server Apparatus 11)

Next, the configuration of the server apparatus 11 may be described. The server apparatus 11 may be configured to include a server communication unit 13, a server storage unit 14, and a server control unit 15.

The server communication unit 13 may be an interface that communicates with an external device by wireless or wired communication and performs transmission and reception of information. For example, the server communication unit 13 may include a wireless LAN (Local Area Network) communication module, a wired LAN communication module, or the like. The server communication unit 13 can transmit and receive information to and from the terminal device 12 via a network 16 such as the Internet.

The server storage unit 14 may include, for example, a primary storage device and a secondary storage device, and may be capable of storing various pieces of information and programs necessary for providing and controlling a game. For example, the server storage unit 14 may include a semiconductor memory, a magnetic memory, an optical memory, or the like. For example, the server storage unit 14 may store information on various game content, information on a plurality of users, and information on various game parts.

(Information on Characters)

The information on characters among various game content may be described with reference to FIG. 2. FIG. 2 illustrates information on three characters. The information on each character may include at least one of character ID, character name, equipment type, degree of rareness, level, HP (Hit Point), attack power, defense power, attribute, and skill.

The character ID may be information capable of uniquely identifying the character. For example, the character ID may be stored in advance in the server storage unit 14. Alternatively, when the server apparatus 11 allows a user to acquire the character, the character ID may be determined.

The character name may be information indicating the name of a character. Unlike the character ID, the character name may not uniquely identify the character. The initial value of the character name may be stored in advance in the server storage unit 14. The character name may change according to the play of the game by the user who acquired the character.

The equipment type may be information indicating the type of item with which the character can be equipped. In the embodiment, the type of item may include, for example, a sword, a spear, a gun, and the like, but the type of item may not be limited thereto. The attack motion of the character may change depending on the type of equipment. The initial value of the equipment type may be stored in advance in the server storage unit 14. The equipment type may change according to the play of the game by the user who acquired the character.

The degree of rareness may be information indicating a degree of rareness of a character. The initial value of the degree of rareness may be stored in advance in the server storage unit 14. The degree of rareness may change according to the play of the game by the user who acquired the character.

The level may be, for example, information indicating a degree of growth of the character. The initial value of the level may be, for example, 1. The level may increase according to the play of the game by the user who acquired the character. As the level increases, at least a portion of the information on the character, such as HP, attack power, defense power, attribute, or skill may change as described later. By changing at least a portion of the information on the character, the character may be strengthened as described later. Therefore, in the embodiment, the higher the level of the character used for the game part, the more advantageous for the user.

HP may be, for example, information indicating the vital power of a character. The HP may include, for example, a current value and an upper limit value. In the embodiment, when the character may be damaged by the attack of the opponent, the current value of HP decreases by the amount of damage. In addition, when the character receives recovery magic of the teammate character, the current value of HP may increase by the recovery amount. In addition, when HP decreases to zero, it may be determined that the character becomes inoperative or fails to clear the game part. Therefore, in the embodiment, the larger the HP of the character used for the game part, the more advantageous it may be for the user. As the level increases, the upper limit value of the HP can increase.

The attack power may be information that contributes to the amount of damage given to an opponent by, for example, character attack. The greater the attack power, the greater the amount of damage given to the opponent. Therefore, in the embodiment, the greater the attack power of the character used for the game part, the more advantageous it may be for the user. As the level increases, the attack power can also increase.

The defense power may be information that contributes to the amount of damage that a character receives by an opponent's attack, for example. The greater the defense power, the less the amount of damage given by the opponent. Therefore, in the embodiment, the greater the defense power of the character used for the game part, the more advantageous it may be for the user. As the level increases, the defense power can also increase.

The attribute may be information indicating superiority and inferiority relationships among characters playing a battle. The attribute indicates at least one attribute of, for example, fire, tree, and water attributes. For example, a character with fire attribute may have greater damage to a character with tree attribute than a usual character and may have smaller damage to a character with water attribute than a usual character.

The skill may be information indicating an effect unique to the character that can be exhibited during the execution of the first game part. For example, a skill having an effect of increasing or decreasing parameters such as character's HP and attack power, a skill having an effect of decreasing damage received from enemy characters, and a skill having an effect of decreasing the HP of the enemy character, and the like, but the skill may not be limited to such exemplary embodiments.

The information on a character may not be limited to the above-described information, and the information on a character may include arbitrary information unique to the character. For example, the information on a character may further include information indicating another character having a predetermined relationship with the character. Another character having a predetermined relationship may include, for example, another character to be consumed to generate the character, another character which can be generated by consuming the character, and the like. More specifically, in a case where a character B may be evolved or awakened to become a character C, the character B and the character C may have a predetermined relationship with each other.

(Information on Items)

The information on items among various game content may be described with reference to FIG. 3. FIG. 3 may illustrate information on three items. The information on each item may include, for example, at least one of item ID, item name, item type, degree of rareness, level, HP, attack power, defense power, attribute, and skill.

The item ID may be information capable of uniquely identifying an item. For example, the item ID may be stored in advance in the server storage unit 14. Alternatively, the server apparatus 11 may determine the item ID when allowing an item to be acquired by any user.

The item name may be information indicating a name of an item. Unlike the item ID, the item name may not uniquely identify the item. The initial value of the item name may be stored in advance in the server storage unit 14. The item name may change according to the play of the game by the user who acquired the item.

The item type may be information indicating a type of an item. In the embodiment, the type of an item may include a sword, a spear, a gun, and the like as described above, but the type of an item may not be limited thereto.

The degree of rareness may be information indicating the degree of rarity of an item. The initial value of degree of rareness may be stored in advance in the server storage unit 14. The degree of rareness may change according to the play of the game by a user who acquired the item.

The level may be, for example, information indicating a degree of growth of the item. The initial value of the level may be, for example, 1. The level may increase according to the play of the game by the user who acquired the item. As the level may increase, at least a portion of the information on the items such as HP, attack power, defense power, attribute, and skill may change, as described later. By changing at least part of the information on the item, the item may be strengthened as described later. Therefore, in the embodiment, the higher the level of the item used for the game part, the more advantageous for the user.

The HP, the attack power, and the defense power are information that changes the HP, the attack power, and the defense power of the character equipped with the item, respectively. In the embodiment, the values of the HP, the attack power, and the defense power of the item are added to the values of the HP, the attack power, and the defense power of the character equipped with the item, respectively. Therefore, in the embodiment, the greater the HP, the attack power, and the defense power of the item used for the game part, the more advantageous it may be for the user. As the level may increase, the HP, the attack power, and the defense power can also increase.

The attribute indicates at least one attribute of, for example, fire, tree, and water attributes. For example, a character equipped with a fire-attribute item may inflict a greater damage to a tree-attribute character than a usual character, and may inflict a smaller damage to a water-attribute character than a usual character. In a case where the attribute of an item is the same as the attribute of a character equipped with the item, the damage given to another character by the character may increase. Therefore, in the embodiment, it may be advantageous for the user that the attribute of the item is the same as the attribute of the character equipped with the item.

The skill may be information indicating an effect unique to an item that can be exhibited during the execution of the first game part. For example, in a case where the item and the character have the same attribute or different attribute, the skill may include a skill having an effect of increasing/decreasing a parameter such as the HP and the attack power of a character, a skill having an effect of decreasing the damage received from an enemy character, or a skill having an effect of reducing the HP of an enemy character, but the skill may not be limited to such exemplary embodiments.

The information on the item may not be limited to the information described above, and the information may include arbitrary information unique to the item. For example, the information on the item may further include information indicating another item having a predetermined relationship with the item. Another item having a predetermined relationship may include, for example, another item that may be consumed to generate an item and another item that can be generated by consuming the item. Specifically, in a case where an item B may be refined or evolved to become an item C, the item B and the item C may have a predetermined relationship with each other.

(Information on Users)

The information on the user may be described with reference to FIG. 4. FIG. 4 may illustrate information on three users. The information on each user may include, for example, a user ID, a first game content, a second game content, and history information.

The user ID may be information capable of uniquely identifying the user. Hereinafter, the user ID may also be simply referred to as a user.

The first game content may be information indicating a game content owned by the user in the game. In a case where the game content may be acquired by the user, the game content may be associated with the user as the first game content and stored in the server storage unit 14. In the embodiment, the first game content may include characters and items owned by the user.

The second game content may be information indicating a game content to be used by the user in the first game part. In the embodiment, the second game content may include one character and one item. In another embodiment, the second game content may include one or more characters and one or more items. As may be described later, the first user can borrow the item that may be the first game content of the second user. The borrowed item can be used in the first game part as the second game content of the first user. In such a case, one game content may be associated with the second user as the first game content, and at the same time, the game content may be associated with the first user as the second game content. Details of the process of associating the second game content to the user may be described later.

The history information may include various pieces of information on the play history of the game played by the user.

For example, the history information may include the number of times of acquisition of the game content by the user, the acquisition frequency, the date and time of acquisition, the number of times of login to the game system 10 by the user, the login frequency, the date and time of login, and the like. In such a case, the user's tendency regarding the play of the game can be determined on the basis of the history information. For example, it may be determined that a user having a large (high) parameter such as the number of times of acquisition of the game content, the acquisition frequency, the number of times of logins to the game system 10, or the login frequency may be more active than a user having a small (low) parameter.

In addition, for example, the history information may include information on the history of item lending and borrowing by the user. The Information on the history of lending and borrowing of items may include, for example, the number of times of lending and borrowing of items, the frequency of lending and borrowing, the date and time of lending and borrowing, information on lent and borrowed items, information on other users who borrowed items of the user, information on other users who lent items to the user, and the like.

The information on the user may not be limited to the above-described information, and the information may include arbitrary information unique to the user, such as the number of virtual coins owned by the user in the game and the user level. The user level may be a parameter that can be increased, for example, according to the play of the game by the user. Therefore, the user level can be an index illustrating the proficiency level of the user with respect to the game.

(Information on First Game Part)

The information on the first game parts among various game parts may be described with reference to FIG. 5. FIG. 5 may illustrate information on three first game parts. The information on each first game part may include at least one of, for example, a first game part ID, an advantageous item type, an advantageous attribute, and game data.

The first game part ID may be information capable of uniquely identifying the first game part.

The advantageous item type may be information indicating an item type that may be advantageous for achieving the game task of the first game part. For example, the advantageous item type may be stored in advance in the server storage unit 14. Alternatively, the server apparatus 11 may automatically determine an advantageous item type on the basis of game data to be described later. For example, the server apparatus 11 may determine the advantageous item type as "gun" for the first game part in which a user plays a battle against an enemy character which may be weak against a long-range attack may be performed.

The advantageous attribute may be information indicating an attribute advantageous for achieving the game task of the first game part. For example, the advantageous attribute may be stored in advance in the server storage unit 14. Alternatively, the server apparatus 11 may automatically determine an advantageous attribute on the basis of game data to be described later. For example, the server apparatus 11 may determine the advantageous attribute as "fire" for the first game part in which a user plays a battle against an enemy character which may be weak against the fire attribute may be performed.

The game data may include various pieces of information necessary for executing the first game part. For example, the game data may include information on enemy characters that are opponents common to a plurality of users, map information of a virtual space (for example, a dungeon) to be searched, game tasks, and rewards (for example, game content) granted to users according to processing results of the first game part, and the like.

The server control unit 15 illustrated in FIG. 1 may be configured to include at least one processor among one or more general-purpose processors that realize specific functions by reading a specific program and one or more dedicated processors specialized for specific processing. The server control unit 15 may control whole operations of the server apparatus 11.

For example, the server control unit 15 may transmit and receives information through the server communication unit 13. In addition, the server control unit 15 may store information on the various game content, information on a plurality of users, and information on various game parts in the server storage unit 14.

In addition, the server control unit 15 may perform various processes on various game parts. For example, the server control unit 15 may execute the first game part in cooperation with two or more terminal devices 12. Hereinafter, this may be described in detail.

The server control unit 15 may perform a matching process of matching two or more users who play the first game part. Specifically, upon receiving a request for generation of a user group from the terminal device 12 of the user, the server control unit 15 may newly generate a user group including the user. In the embodiment, a plurality of user groups may exist simultaneously. In addition, each user group may include, for example, up to three users. Two or more users included in one user group are determined as the users who play the first game part in the multi-player format. Hereinafter, the two or more users included in one user group may also be referred to as two or more matched users.

In one example, the server control unit 15 may receive the request for generation of the user group from the terminal device 12 of the user A and may newly generate the user group A including the user A.

Subsequently, the server control unit 15 may transmit matching screen display instruction to the terminal device 12 of the user who may have transmitted the request for generation of the user group. In the following description, it may be assumed that the screen display instruction may include various pieces of information necessary for the terminal device 12 receiving the display instruction to display the screen. The server control unit 15 causes objects to be displayed on the screen on the terminal device 12 by transmitting the screen display instruction.

For example, the server control unit 15 allows the terminal device 12 of the user A to cause objects to be displayed on a matching screen. Details of the matching screen may be described later.

Subsequently, upon receiving the request for addition to the user group from the terminal device 12 of the user not included in any user group, the server control unit 15 may select one user group from among the plurality of user groups on the basis of a predetermined algorithm. The server control unit 15 may add the user to the selected one user group. Alternatively, the server control unit 15 may select one or more user groups from among the plurality of user groups. In such a case, the server control unit 15 may allow the terminal device 12 of the user to display information on the selected one or more user groups and allow the user to select any one of the user groups. In a case where the server control unit 15 receives the information indicating one user group selected by the user from the terminal device 12, the server control unit 15 may add the user to the user group.

As a predetermined algorithm, on the basis of the information on the user of the terminal device 12 that transmitted the request for addition to the user group and the information on the plurality of users included in the plurality of user groups, any one user group may be selected from among the plurality of user groups.

For example, the server control unit 15 may preferentially select a user group including another user of which the number of game content or the level of the owned game content or the user level may be close with respect to the user of the terminal device 12 that may have transmitted the request for addition to the user group. According to such a configuration, for example, the users of which degrees of growth of owned game content are closer or the users of which proficiencies with respect to the game are close are preferentially matched. For this reason, a sense of impartiality occurs between the two or more users who play the first game part, and thus, formation of cooperative relationships can be facilitated.

Alternatively, as the number or level of an item owned by the user of the terminal device 12 that may have transmitted the request for addition to the user group or the user level may be smaller, the server control unit 15 may preferentially select a user group including another user of which the number or level of an owned item or the user level may be large. According to such a configuration, for example, beginners and experts of the game may be preferentially matched. Therefore, the beginners of the game can be given a motivation for playing the first game part.

The predetermined algorithm may not be limited to the above-mentioned one. For example, the terminal device 12 may transmit to the server apparatus 11 a signal (second signal) indicating an item selected in response to user operation on the terminal device 12 together with the request for addition to the user group. In such a case, the server control unit 15 may preferentially select a user group including another user who owns the item indicated by the second signal from among the plurality of user groups. According to such a configuration, the user of the terminal device 12 that transmits the request for addition to the user group may be preferentially matched with another user who owns the item which the user wants to borrow. Therefore, the probability that the user can borrow the item from another user may be increased. Thus, for example, a user who wants to use an unowned item can be given a motivation for performing multi-player.

Alternatively, the terminal device 12 may transmit to the server apparatus 11 a request for automatic selection of a predetermined item along with the request for addition to the user group. In such a case, upon receiving the request for selection from the terminal device 12, the server control unit 15 may extract one or more items that are advantageous for playing the first game part among the plurality of items on the basis of predetermined information.

Herein, the predetermined information may include the information on the user of the terminal device 12. In such a case, the server control unit 15 may preferentially extract, for example, an item having the same attribute as the character associated with the user as the first game content as an item advantageous for playing the first game part. Alternatively, the predetermined information may include the information on the first game part. In such a case, the server control unit 15 may preferentially extract an item having a type indicated by an advantageous item type included in the information on the first game part or an item having an attribute indicated by an advantageous attribute as an item advantageous for the play of the first game part.

Then, the server control unit 15 preferentially may select a user group including another user who owns the extracted item. According to such a configuration, the user of the terminal device 12 that may transmit the request for addition to the user group may be preferentially matched with another user who owns an item advantageous for playing the first game part. Therefore, the probability that the user can borrow the item from another user may be increased. Therefore, for example, a user who wants to use an item advantageous for playing the first game part can be given a motivation for performing multi-player. In another embodiment, instead of the server control unit 15, the terminal device 12 may extract one or more items that are advantageous for playing the first game part from among a plurality of items on the basis of predetermined information. In such a case, the terminal device 12 may transmit a second signal indicating the extracted item to the server apparatus 11.

In one example, the server control unit 15 may receive a request for addition to the user group from each of the terminal devices 12 of the users B and C and may select the user group A including the user A from among the plurality of user groups. The server control unit 15 may add the users B and C to the selected user group A. In other words, the server control unit 15 may match the users A to C as two or more users who play the first game part in the multi-player format.

Then, the server control unit 15 may transmit matching screen display instruction to the terminal device 12 of the user who may have transmitted the request for addition to the user group. The matching screens displayed by the terminal devices 12 of the two or more users included in one user group may be substantially the same. Upon receiving the request for exclusion from the user group from the terminal device 12 of the user included in the user group, the server control unit 15 may exclude the user from the user group.

The addition of a user to a user group and the exclusion of a user from a user group may be executed at an arbitrary timing until a user included in the user group starts a first game part.

In one example, the server control unit 15 may display substantially the same matching screen on each of the terminal devices 12 of the users A to C included in the user group A. Then, the matching process may be terminated.

In this manner, the server control unit 15 may select two or more users who play the first game part from among a plurality of users by the matching process. Hereinafter, the user group A may be described.

After executing the matching process, the server control unit 15 may store each user included in the user group A and the second game content in association with each other in the server storage unit 14. For example, the server control unit 15 may select and change the second game content to be associated with each user in response to user operation on each terminal device 12 of each user.

Subsequently, upon receiving the first signal from the terminal device 12 of the user, the server control unit 15 may establish the association between the user and the second game content. Hereinafter, a state in which the association between the user and the second game content may be established may also be referred to as an established state. The server control unit 15 may prohibit the change of the second game content associated with the user who may be in the established state. The server control unit 15 may cancel the established state of the user in response to the request from the terminal device 12 of the user who may be in the established state.

In the embodiment, a character associated with each user included in the user group A as the second game content may be selected from among characters associated with the user as the first game content. On the other hand, an item associated with each user as a second game content may be selected from among an item associated with the user as a first game content and one or more items excluding an item which may be a second game content of which association with another user may be established among a plurality of items associated with another user as the first game content. According to such a configuration, for example, a user A can borrow an item that a user B does not use in the first game part among a plurality of items owned by the user B in the game, and the item can be used in the first game part. Hereinafter, for the convenience of description, in a case where an item associated with the user as the second game content may be an item associated with another user as the first game content, the item may also be referred to as a "borrowed item". Details of the process by which the user borrows an item of another user may be described later.

In one example, the item that may be the second game content of the user A may be an item selected from the first game content of the user B, i.e. a borrowed item. On the other hand, items that are the second game content of the users B and C are items selected from the first game content of the users B and C, respectively. In addition, the association between each of the users A to C and the second game content may be established.

Subsequently, upon receiving the request for start of the first game part from the terminal device 12 of any user included in the user group A, the server control unit 15 may start the first game part. The server control unit 15 may execute the first game part on the basis of the second game content associated with each user included in the user group A and the user operation for each terminal device 12 used by each user. In the embodiment, in the first game part, each user plays a battle against an enemy character common to the users A to C by using a character and an item that may be the second game content of user's own.

Subsequently, for example, in a case where the server control unit 15 determines that the user A to C may have succeeded or failed in achievement of the complete task of winning against the enemy character, the server control unit 15 ends the first game part. The server control unit 15 grants the users A to C rewards corresponding to the processing result of the first game part, for example, success or failure in achievement of the complete task.

Upon ending the first game part, the server control unit 15 may cancel the user group A. In addition, the server control unit 15 may cancel the association between each of the users A to C and the second game content. This corresponds to a mechanism in which the borrowed item of each user may be returned to an original user. In this manner, a series of processes for allowing the two or more users to play the first game part in the multi-player format may be ended. In another embodiment, in a case where another first game part may be to be executed continuously after one first game part may be ended, another first game part may be started without cancellation of the user group A and cancellation of association between each of the users A to C and the second game content.

In another embodiment, in a case where communication between the terminal device 12 of at least one user among the users A to C and the server apparatus 11 may be disconnected during the execution of the first game part, the server control unit 15 may end the first game part. In this case, the server control unit 15 may perform a process of canceling the user group A and a process of canceling the association between each of the users A to C and the second game content. Alternatively, the server control unit 15 may automatically operate a character of the user of the terminal device 12 with which communication of the server apparatus 11 may be disconnected and may continue to execute the first game part. In such a case, the server control unit 15 may cancel the association between the user of the terminal device 12 with which communication of the server apparatus 11 may be disconnected and the second game content or may not cancel the association.

In addition, after the execution of the first game part, the server control unit 15 may preferably allow the terminal device 12 of the user A who may have played the first game part by using the borrowed item to display the information on the second game part. The second game part may be an arbitrary game part in which a user can acquire the same item as the borrowed item or another item having the above-described predetermined relationship with the borrowed item among various game parts including the first game part and the game part for single-player. According to the processing result of the second game part, the same item as the borrowed item or another item having the predetermined relationship with the borrowed item may be assigned to the user.

In the embodiment, the second game part may include an event to which at least one game content selected from among the plurality of game content including items being the same as or having a predetermined relationship with the borrowed item may be assigned to the user. In the second game part, the assignment of the game content to the user may be executed according to the consumption of virtual coins or the predetermined game content owned by the user in the game. Alternatively, the second game part may be a first game part or a game part for single-player in which the item being the same as or having a predetermined relationship with the borrowed item may be included in the reward.

The information on the second game part may include, for example, a GUI (Graphical User Interface) for receiving user operation for starting the second game part. The server control unit 15 may execute the second game part in response to the user operation on the GUI displayed on the terminal device 12 of the user A. According to the processing result of the second game part, the server control unit 15 can associate the item being the same as or having a predetermined relationship with the borrowed item with the user A as the first game content.

(Configuration of Terminal Device 12)

Next, the configuration of the terminal device 12 may be described. As illustrated in FIG. 1, the terminal device 12 may be configured to include a terminal communication unit 17, a terminal storage unit 18, a display unit 19, an input unit 20, and a terminal control unit 21.

The terminal communication unit 17 may be an interface that communicates with an external device by wireless or wired communication and may transmit and may receive information. For example, the terminal communication unit 17 may include a wireless communication module corresponding to a mobile communication standard such as LTE (Long Term Evolution) (registered trademark), a wireless LAN communication module, a wired LAN communication module, or the like. The terminal communication unit 17 may transmit and may receive information with the server apparatus 11 via the network 16.

The terminal storage unit 18 may include, for example, a primary storage device and a secondary storage device and can store various pieces of information and programs necessary for the processing of a game provided from the server apparatus 11. For example, the terminal storage unit 18 may include a semiconductor memory, a magnetic memory, an optical memory, or the like. For example, the terminal storage unit 18 may store a portion or all of the above-described information on various game content, the information on a plurality of users, and the information on various game parts. For example, a portion or all of these pieces of the information are retrieved from the server apparatus 11 by the terminal control unit 21.

The display unit 19 may be, for example, a display device such as a liquid crystal display or an organic EL display and can display various screens.

The input unit 20 may be, for example, an input interface including a touch panel provided integrally with the display unit 19 and can receive user input to the terminal device 12. The input unit 20 may include physical keys or may further include various input interfaces including a pointing device such as a mouse and the like.

The terminal control unit 21 may be configured to include at least one processor among one or more general-purpose processors that realize a specific function by reading a specific program and one or more dedicated processors specialized for specific processing. The terminal control unit 21 may control whole operations of the terminal device 12. For example, the terminal control unit 21 may transmit and may receive information through the terminal communication unit 17. In addition, the terminal control unit 21 may execute (activates) an application of a game in response to operation of the user. In addition, when acquiring a screen display instruction from the server apparatus 11 through the terminal communication unit 17, the terminal control unit 21 may display the screen on the display unit 19 or updates the screen on the basis of the instruction. In addition, the terminal control unit 21 may transmit the information based on the user operation received through the input unit 20 to the server apparatus 11 through the terminal communication unit 17.

In addition, the terminal control unit 21 may perform various processes on various game parts. For example, the terminal control unit 21 may execute the first game part in cooperation with the server apparatus 11 and one or more other terminal devices 12. Hereinafter, this may be described in detail.

The terminal control unit 21 can transmit the above-described request for generation of the user group or the request for addition to the user group to the server apparatus 11. The terminal control unit 21 may receive matching screen display instruction transmitted by the server apparatus 11 in response to the request for generation of the user group or the request for addition to the user group. The terminal control unit 21 may display the matching screen on the display unit 19 on the basis of the received display instruction.

Hereinafter, operations of the server apparatus 11 and the terminal device 12, which are executed with the matching screen displayed on the display unit 19, may be described with reference to FIGS. 6 to 9. Herein, an example where the terminal control unit 21 of the terminal device 12 of the user A transmits a request for generation of a user group to the server apparatus 11 and a user group A including only the user A is newly generated may be described.

Figure 6:
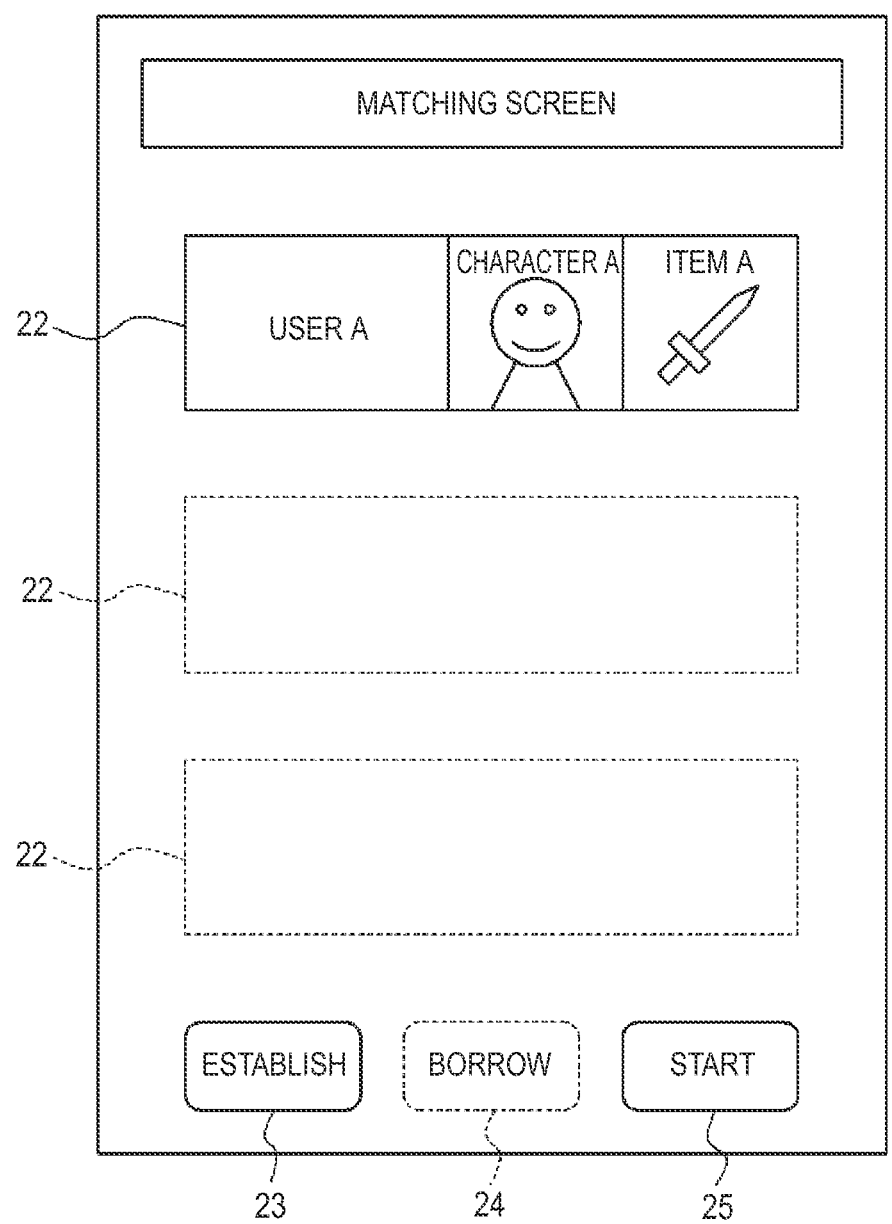
FIG. 6 is a diagram illustrating an example of a matching screen displayed on a terminal device.

FIG. 6 may illustrate a matching screen displayed on the terminal device 12 of the user A after transmitting the request for generation of the user group. Three user frames 22, an establish button 23, a borrow button 24, and a start button 25 are displayed on the matching screen.

Each user frame 22 may be an area for displaying information on each user included in the user group A. In FIG. 6, the information on the user A may be displayed in the upper user frame 22. For the information on the user A, for example, a user name and a character A which may be a second game content associated with the user A, and an item A are displayed. On the other hand, the middle user frame 22 and the lower user frame 22 are blank.

The user frame 22 in which the information on the user A may be displayed may function as a GUI for receiving user operation for changing the second game content of the user A. In response to the user operation on the user frame 22, the terminal control unit 21 may select each one from the characters and items that are the first game content of the user A. The terminal control unit 21 changes the character A and item A which are the second game content of the user A to the selected character and item, respectively. In this manner, the second game content of the user A may be selected from the first game content of the user A in response to the user operation on the user frame 22. When the second game content of the user A is changed, the terminal control unit 21 notifies the server apparatus 11 of the changed second game content. Upon receiving the notification from the terminal device 12 of the user A, the server control unit 15 associates the changed second game content with the user A and updates the information on the user A stored in the server storage unit 14.

The establish button 23 may be a GUI for receiving user operation for establishing the association between the user A and the second game content. The terminal control unit 21 may transmit the above-described first signal to the server apparatus 11 in response to the user operation on the establish button 23. Upon receiving the first signal from the terminal device 12 of the user A, the server control unit 15 may establish the association between the user A and the second game content. In addition, in a case where the terminal control unit 21 detects the user operation on the establish button 23 when the user A may be in the established state, the terminal control unit 21 may transmit a request for cancellation of the established state of the user A to the server apparatus 11. In this case, upon receiving the request for cancellation of the established state from the terminal device 12 of the user A, the server control unit 15 may cancel the established state of the user A.

The borrow button 24 may be a GUI for receiving user operation for borrowing an item owned by another user included in the user group A. In the state illustrated in FIG. 6, since any user other than the user A may not be included in the user group A, the server control unit 15 or the terminal control unit 21 of the terminal device 12 of the user A temporarily stop receiving the user operation on the borrow button 24. In a case where the reception of the user operation may be stopped, the borrow button 24 may be displayed in a mode different from the normal mode, for example, the borrow button 24 may be displayed darker (grayed out) than the normal time. The processes in response to the user operation on the borrow button 24 may be described later.

The start button 25 may be a GUI for receiving user operation for starting the first game part. Only in a case where a predetermined condition may be satisfied, the terminal control unit 21 may validate the reception of the user operation on the start button 25. The predetermined condition may include, for example, a condition that the number of users included in the user group A may be equal to or larger than a predetermined value and/or a condition that all the users included in the user group A are in an established state. The terminal control unit 21 may transmit a request for start of the first game part to the server apparatus 11 in response to the user operation on the start button 25. Upon receiving the request for start of the first game part from the terminal device 12 of the user A, the server apparatus 11 may start the first game part.

Herein, it may be assumed that, while the user operation on any of the establish button 23, the borrow button 24, and the start button 25 may not be detected in the terminal device 12 of the user A, each of the terminal devices 12 of the users B and C may transmit the request for addition to the user group to the server apparatus 11. The server apparatus 11 may add the users B and C to the user group A. The server apparatus 11 may transmit the matching screen display instruction to the terminal devices 12 of the users A to C.

Figure 7:
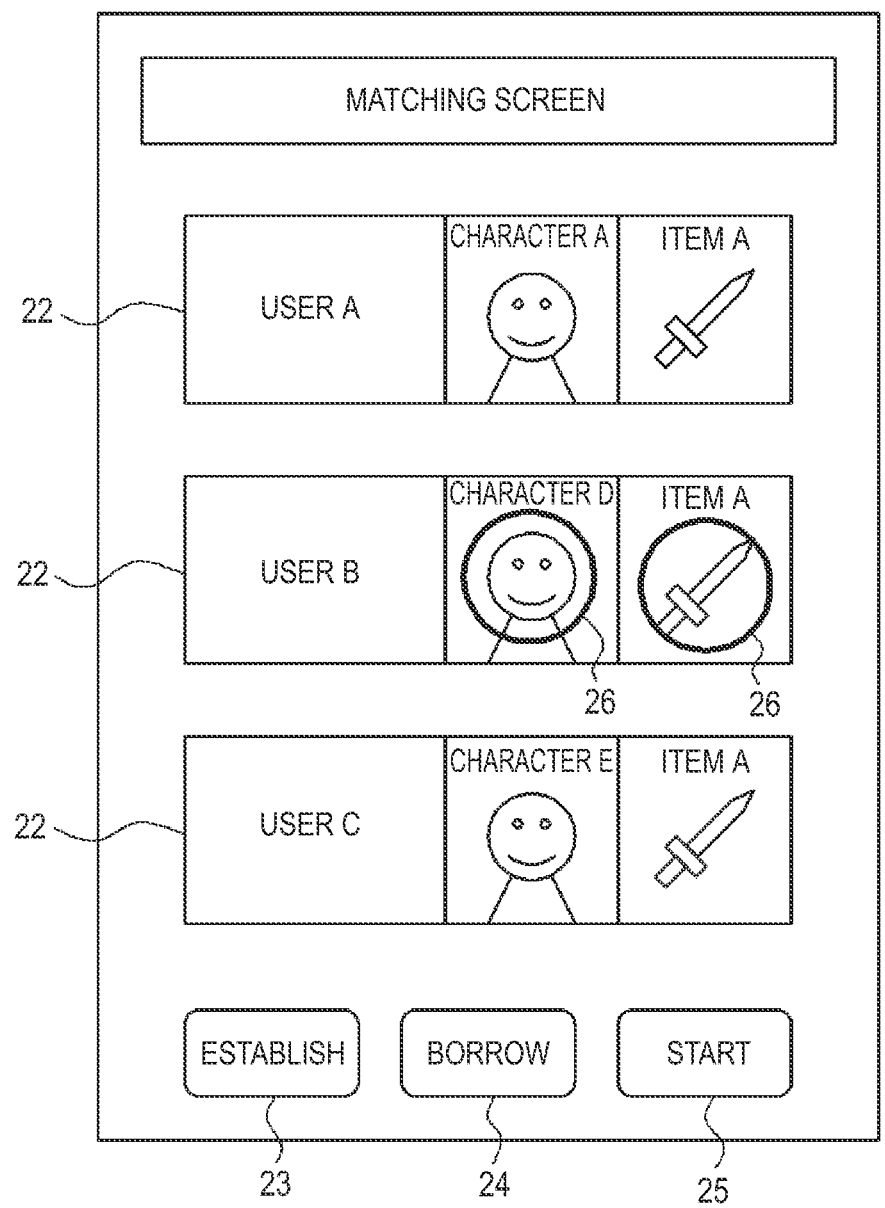
FIG. 7 is a diagram illustrating an example of a matching screen displayed on a terminal device.

The terminal device 12 of the user A updates the matching screen on the basis of the received display instruction. FIG. 7 may illustrate an updated matching screen. As illustrated in FIG. 7, information on the user B and information on the user C are displayed in the middle user frame 22 and the lower user frame 22, respectively, that are blank in FIG. 6.

On the other hand, the terminal devices 12 of the users B and C display the same screen as the matching screen illustrated in FIG. 7, for example, except that the start button 25 may not be displayed on the basis of the received display instruction.

As illustrated in FIG. 7, a marker 26 displayed on the user frame 22 in the middle row may be an image indicating that the association between the user B and the second game content has been established. When the user B is in the established state, the marker 26 may be displayed on each of the terminal devices 12 of the users A to C. Namely, FIG. 7 may illustrate that the user A and the user C are not in the established state, but the user B is in the established state. Hereinafter, the user who is not in the established state may also be referred to as a first user, and the user who is in the established state may also be referred to as a second user.

In a case where the first user and the second user exist in the user group A, the server control unit 15 may allow the terminal device 12 of the first user to cancel the stop of receiving the user operation on the borrow button 24. For example, in FIG. 6, the borrow button 24 which may have been displayed in a display mode different from a usual display mode may be changed to the normal display mode as illustrated in FIG. 7. In this state, the user operation on the borrow button 24 can be received.

Herein, it may be assumed that the terminal control unit 21 of the terminal device 12 of the user A who may be the first user may have received the user operation on the borrow button 24. In such a case, the terminal control unit 21 may transmit to the server apparatus 11 a request for borrowing one or more items excluding the item that may be the second game content of which association with the user B may be established among the plurality of items associated with the user B who may be the second user as the first game content.

Upon receiving the request for borrowing from the terminal device 12 of the user A, the server control unit 15 may extract one or more items excluding the item that may be the second game content of which association with the user B may be established among the plurality of items associated with the user B as the first game content. The server control unit 15 may transmit to the terminal device 12 a display instruction for allowing each terminal device 12 of the user A to selectably display each of the extracted one or more items. The terminal control unit 21 may select one item from among the extracted and displayed one or more items in response to the user operation. The terminal control unit 21 may change the item to be associated with the user A as the second game content to the item selected from the item A. The terminal control unit 21 may notify the server apparatus 11 of the second game content after the change of the user A. In another embodiment where one or more items are associated with one user as the second game content, the terminal control unit 21 may select one or more items in response to the user operation. In such a case, the terminal control unit 21 may associate the selected item as an additional second game content with the user A, and the terminal control unit may change the item to be associated with the user A as the second game content to the item selected from the item A. The terminal control unit 21 may notify the server apparatus 11 of the second game content after addition or change of the user A.

In this manner, the server control unit 15 may extract one or more items excluding the item that is the second game content of which association with the user B may be established among the plurality of items associated with the user B as the first game content. According to such a configuration, for example, the server control unit 15 may temporarily suppress the association of the item with the user B as the second game content may be duplicated to be associated with the user A as the second game content. Therefore, the number of items existing in the game may be maintained constant, so that the game balance can be appropriately adjusted. In addition, according to such a configuration, it may be possible to allow the user to feel the same feeling as lending and borrowing of actual products among users, and thus, it may be possible for the users to easily understand the game.

In addition, according to the above-described configuration, as may be described below, it may be possible to suppress occurrence of restriction on use of a game content of a user. For the convenience of comparison, considered may be a configuration where an item may be lent to a user A before association between a user B and a second game content may be established. In such a configuration, a situation may occur where the user B lent the item that the user wants to use in the first game part to the user A earlier due to, for example, an erroneous operation, and thus, the user B cannot use the item. On the other hand, according to the server apparatus 11 of the embodiment, since the item may be lent to the user A after the association between the user B and the second game part may be established, the occurrence of the above-described situation can be suppressed.

Alternatively, upon receiving the request for borrowing from the terminal device 12 of the user A, the server control unit 15 may extract all the items associated with the user B as the first game content.

Alternatively, upon receiving the request for borrowing from the terminal device 12 of the user A, on the basis of predetermined information, the server control unit 15 may extract one or more items excluding the item that may be the second game content of which association with the user B may be established among the plurality of items associated with the user B as the first game content.

For example, the predetermined information may include the information on two or more users included in the user group A. For example, the server control unit 15 preferentially may extract one or more items having the same or different attributes as or from the character or item associated with each of the users B and C as the second game content among the items associated with the user B as the first game content excluding the item that may be the second game content of which association with the user B may be established. According to such a configuration, the probability that the attributes of the second game content are unified or dispersed in a well-balanced manner for the two or more users included in the user group A may be increased.

The server control unit 15 may use information such as level or skill other than the attribute among the information on the user. For example, the server control unit 15 may preferentially extract an item of which level may be large or an item of which skill may be strong among all the items which are associated with the user B as the first game content excluding the items that are second game content of which association with the user B may be established. According to such a configuration, the probability that the user A can play the first game part under advantageous conditions may be improved.

In addition, for example, the server control unit 15 may preferentially extract the item which can be equipped by the character associated with the user A as the second game content and can be advantageous for playing the first game part among all the items associated with the user B as the first game content excluding the item that may be the second game content of which association with the user B may be established. As described above, it may be advantageous for the user that the attribute of the item may be the same as the attribute of the character equipped with the item. Therefore, for example, the item having the same attribute as the character associated with the user A as the second game content may be preferentially extracted.

In addition, for example, the server control unit 15 may selectively extract only the item which can be equipped by the character associated with the user A as the second game content among all the items associated with the user B as the first game content excluding the item that may be the second game content of which association with the user B may be established. For example, only the items of the type corresponding to the equipment type of the character may be extracted. The extracted items that can be equipped by the character may not be limited to a particular type of equipment, and the condition of being able to be equipped by the character may also be determined on the basis of arbitrary game parameters such as the level of the character or item or the equipment cost. For example, a character may be able to equip an item with a higher level or equipment cost when that character has a higher level or equipment cost.

In addition, for example, the predetermined information may include the information on the first game part. For example, the server control unit 15 preferentially may extract one or more items having an attribute indicated by the advantageous attribute included in the first game part information among all the items associated with the user B as the first game content. According to such a configuration, the probability that the user A can play the first game part under advantageous conditions may be improved.

Herein, it may be assumed that the server control unit 15 may extract an item C from all the items that are the first game content of the user B.

Figure 8:
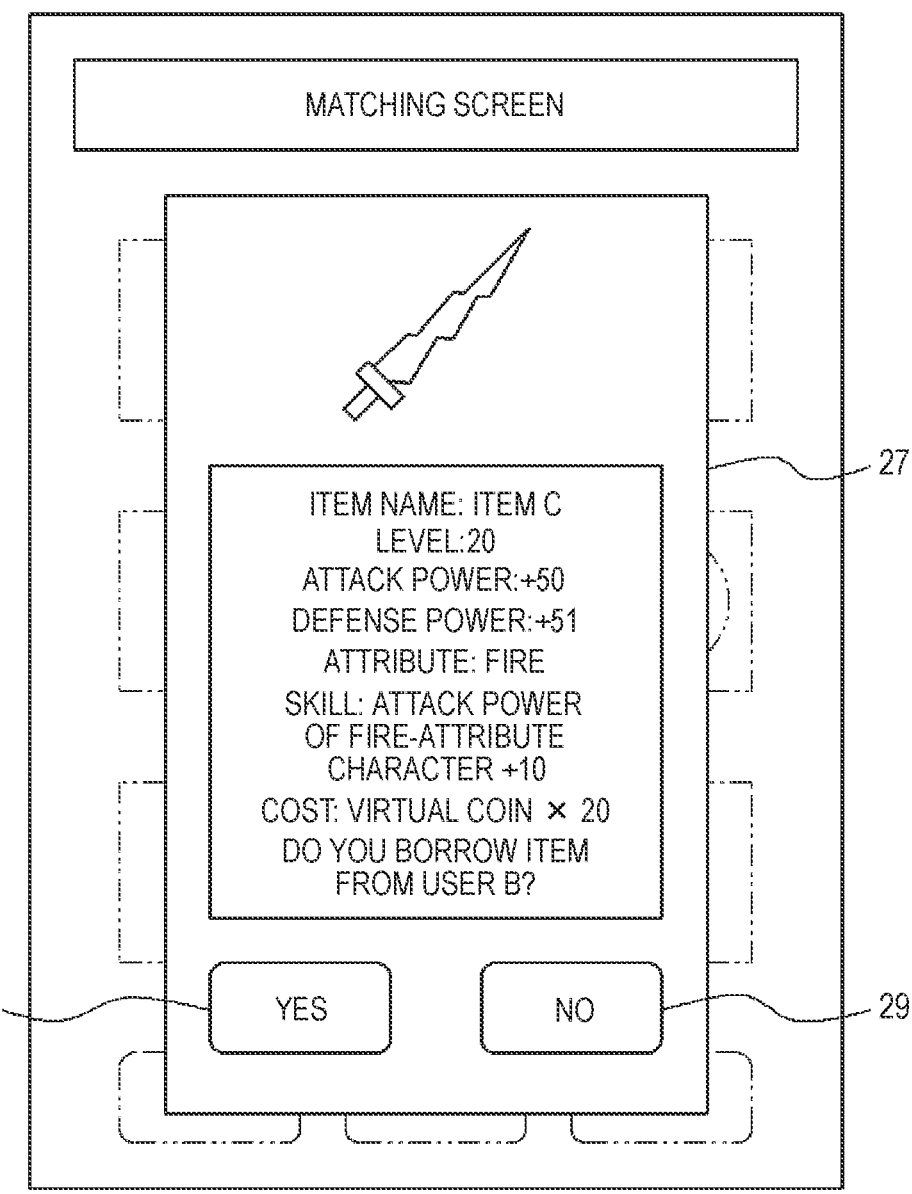
FIG. 8 is a diagram illustrating an example of a matching screen displayed on a terminal device.

The server control unit 15 may allow the terminal device 12 of the user A to display the information on the extracted item. FIG. 8 may illustrate a state in which information 27 on the extracted item C, a Yes button 28, and a No button 29 are superimposed and displayed on the matching screen.

The information 27 on the item C may include, for example, an image of the item C, an item name, a level, an attack power, a defense power, an attribute, a skill, and a cost. The cost may be information indicating the resources of the user A necessary for borrowing the item C. The content of the cost may be stored in advance in the server storage unit 14 or may be automatically determined by the server control unit 15 on the basis of the information on the item C. For example, in the example illustrated in FIG. 8, the user A can borrow the item C of the user B by consuming 20 virtual coins.

The Yes button 28 may be a GUI for receiving user operation for borrowing the item C. The terminal control unit 21 may change the item A associated with the user A as the second game content to the item C owned by the user B in response to the user operation on the Yes button 28. In response to the user operation on the Yes button 28, the server control unit 15 updates the information on the user A so that the 20 virtual coins owned by the user A are consumed. The server control unit 15 may grant a predetermined reward to the user B who owns the item C. The predetermined reward may be predetermined or may be at least a portion of the 20 virtual coins consumed by the user A.

The No button 29 may be a GUI for receiving a user operation for allowing the information 27, the Yes button 28, and the No button 29 on the item C superimposed to be non-displayed on the matching screen. In response to user operation on the No button 29, the terminal control unit 21 may allow the information 27 on the item C, the Yes button 28, and the No button 29 to be non-displayed.

Figure 9:
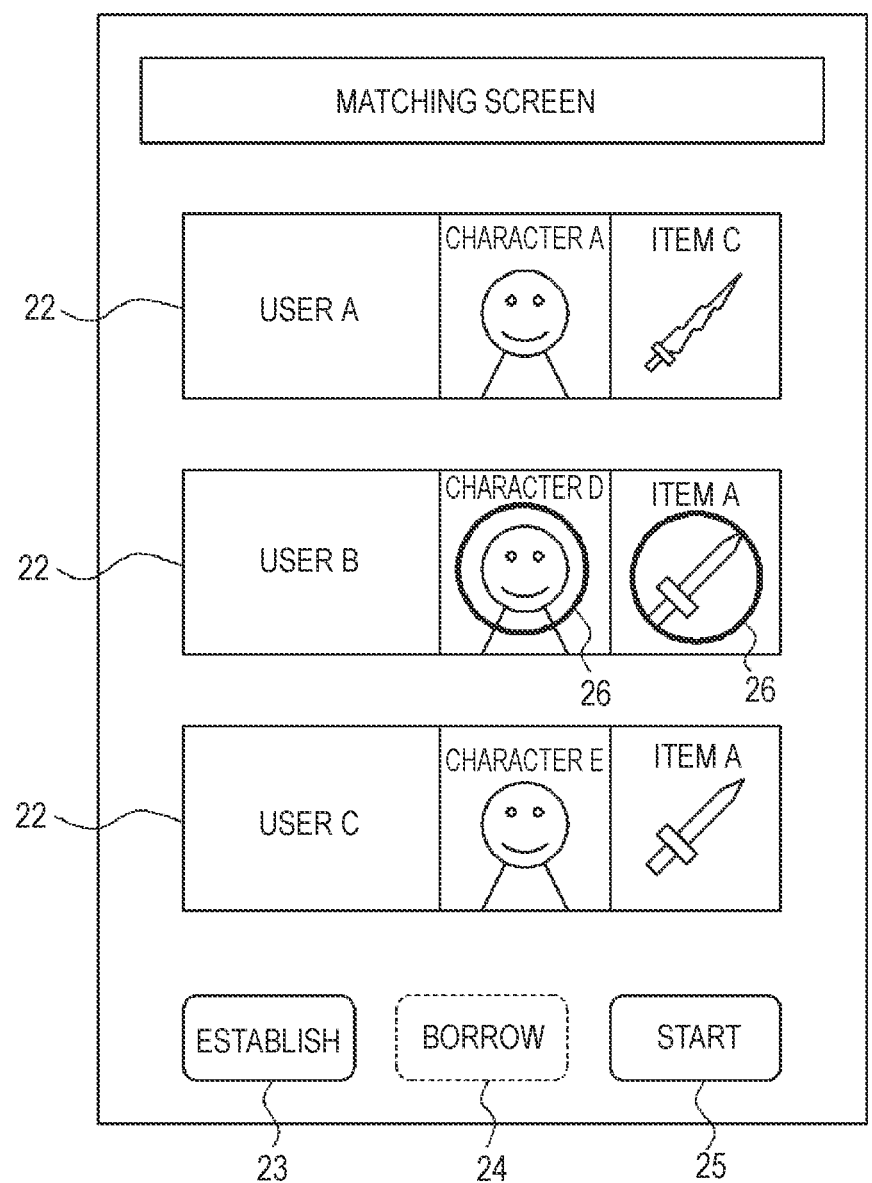
FIG. 9 is a diagram illustrating an example of a matching screen displayed on a terminal device.

Herein, it may be assumed that the terminal control unit 21 may have received the user operation on the Yes button 28. Therefore, as described above, the item C of the user B may be associated with the user A as the second game content. For example, the image of the item A displayed on the user frame 22 in the upper row in FIG. 7 may be changed to the image of the item C as illustrated in FIG. 9. As long as the item associated with the user A as the second game content may be a borrowed item, the reception of the user operation on the borrow button 24 may be temporarily stopped and the borrow button 24 may displayed in a mode (gray layout) different from a normal mode. In another embodiment where n may be an integer of 2 or more and the maximum n items are associated with the user A as the second game content, the n items associated with the user A as the second game content are all borrowed items, the reception of the user operation on the borrow button 24 may be temporarily stopped, and the borrow button 24 may be displayed in a mode (gray layout) different from the normal mode.

Thereafter, for example, after all the users included in the user group may have been in the established state, upon receiving the user operation on the start button 25, the terminal control unit 21 may transmit a request for start of the first game part to the server apparatus 11. Upon receiving the request for start of the first game part from the terminal device 12 of the user A, the server control unit 15 may start the first game part.

The server control unit 15 determines whether or not the users A to C succeeded or failed in achieving the complete task of the first game part. In a case where it is determined that the users neither succeeded nor failed in achieving the complete task, the server control unit 15 continues to execute the first game part. On the other hand, in a case where it is determined that the users succeeded or failed in achieving the complete task, the server control unit 15 may end the first game part and may cancel the association between each of the users A to C and the second game content. Therefore, the item C borrowed from the user B by the user A may be returned to the user B.

When the first game part is ended, the server control unit 15 may grant predetermined rewards to the users A to C, for example, on the basis of success or failure in achievement of the complete task. The server control unit 15 may transmit a display instruction of displaying a result screen to each of the terminal devices 12 of the users A to C. The result screen may be a screen on which, for example, information on the processing result of the first game part (for example, success or failure in achievement of the complete task and contents of the rewards or the like) may be displayed.

Figure 10:
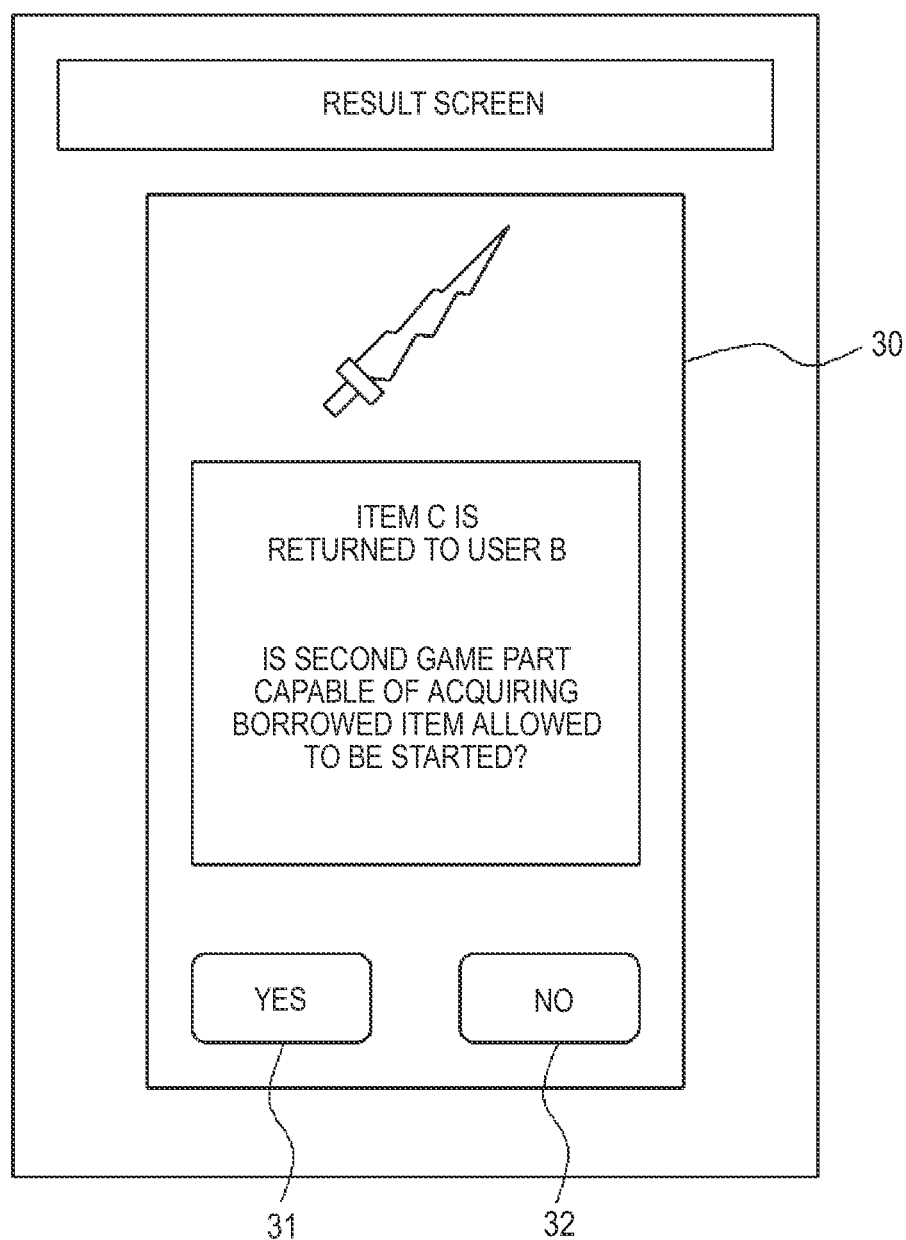
FIG. 10 is a diagram illustrating an example of a result screen displayed on a terminal device.

The result screen displayed on the terminal device 12 of the user A borrowing the item from the user B may include, for example, the information 30 on the second game part, the Yes button 31, the No button 32, as illustrated in FIG. 10.

The information 30 on the second game part may include, for example, an image of the item C, a message indicating that the item C may have been returned to the user B, and a message asking whether or not to start the second game part.

The Yes button 31 may be a GUI for receiving user operation to start the second game part. The terminal control unit 21 may transmit a request for start of the second game part to the server apparatus 11 in response to the user operation on the Yes button 31. Upon receiving the request for start of the second game part, the server control unit 15 may start the second game part. The server control unit 15 can assign the user A an item being the same as or having a predetermined relationship with the item C according to the processing result of the second game part.

Figure 11:
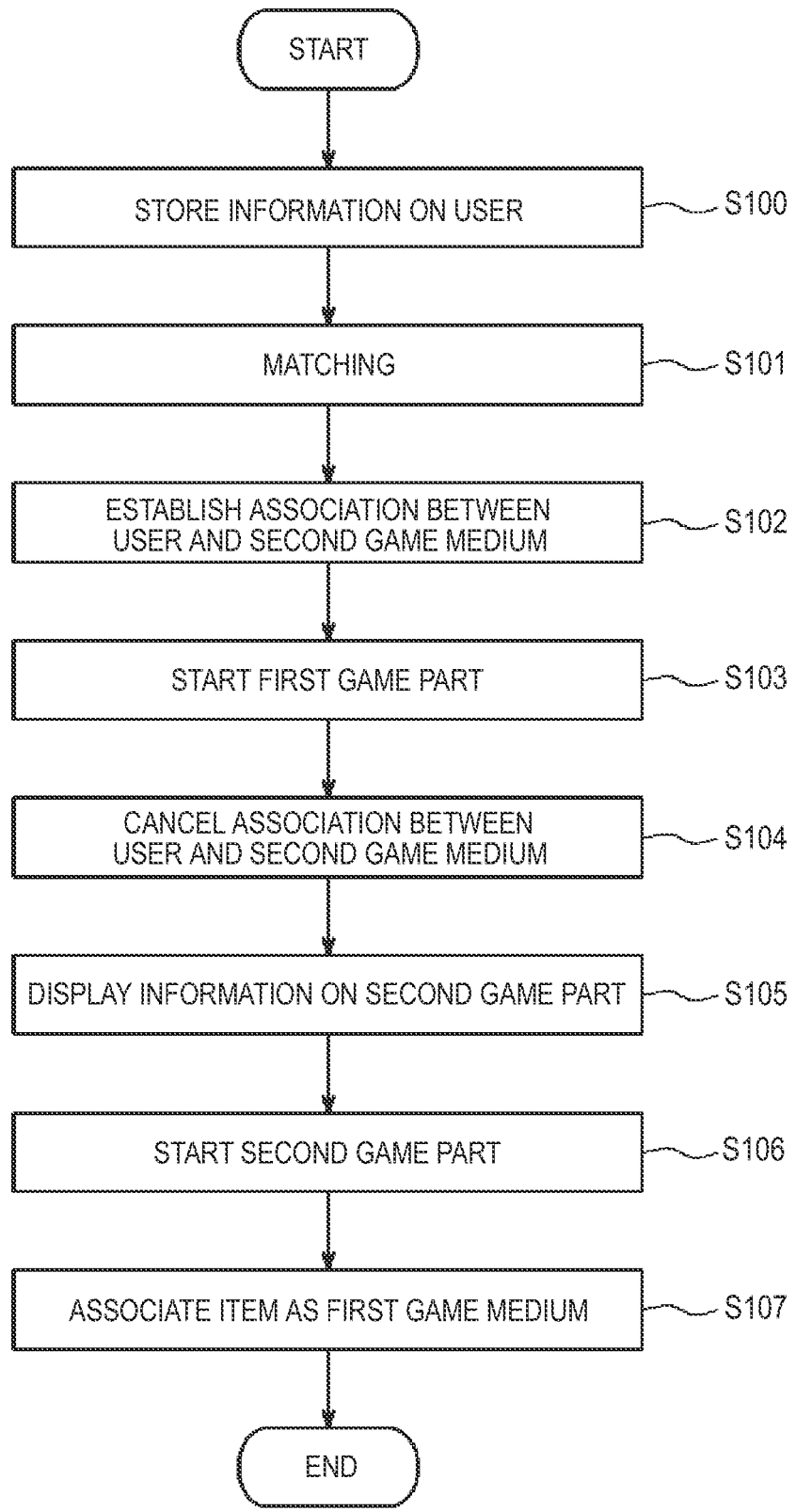
FIG. 11 is a flowchart illustrating operations of a server apparatus.

Next, the operation flow of the server apparatus 11 may be described with reference to FIG. 11.

Step S100: First, the server control unit 15 may store information on various game content, information on a plurality of users, and information on various game parts in the server storage unit.

Step S101: Subsequently, the server control unit 15 may perform a matching process of matching two or more users who play the first game part. For example, users A to C may be matched by the matching processing.

Step S102: Subsequently, upon receiving the first signal from each of the terminal devices 12 of the users A to C, the server control unit 15 may establish association between each of the users A to C and the second game content. Herein, it may be assumed that the second game content of which association with the user A may be established according to the second signal from the user A may be a borrowed item which may be borrowed from the user B (item C).

Step S103: Subsequently, for example, upon receiving the request for start of the first game part from the terminal device 12 of the user A, the server control unit 15 may start the first game part.

Step S104: Subsequently, when the first game part may be ended, the server control unit 15 may cancel the association between each of the users A to C and the second game content.

Step S105: Subsequently, the server control unit 15 may allow the terminal device 12 of the user A who may have played the first game part by using the borrowed item to display information on the second game part.

Step S106: Subsequently, upon receiving the request for start of the second game part from the terminal device 12 of the user A, the server control unit 15 may start the second game part.

Step S107: The server control unit 15 assigns the user A the item being the same as or having a predetermined relationship with the item C according to the processing result of the second game part.

As described above, the server apparatus 11 according to the embodiment may execute the first game part on the basis of the second game content of which association with each of the matched two or more users may be established and the user operation on the two or more terminal devices 12 used by the two or more users. Herein, the second game content associated with the first user among the two or more users may be a game content selected from among a plurality of the first game content associated with the first user and a plurality of the first game content associated with the second user among the two or more users. According to such a configuration, the first user can play the first game part by borrowing the first game content owned by the second user. Therefore, since the first user can use the game content that may not be owned by the first user through the first game part, the first user can be given a motivation for performing the multi-player.

In addition, according to the above-described configuration, it may be possible to correct an unbalance in strength among the users who perform multi-player. Namely, in a game where a game content such as an item may be used, in general, a user who may be skilled in the game, for example, may have a relatively long game play time, and may have a stronger (that is, more advantageous to the user) item.

According to the server apparatus 11 according to the embodiment, for example, a beginner of the game can play the first game part by borrowing a relatively strong item from an expert in the game. For this reason, it may be possible for a beginner of the game to advantageously play the first game part by borrowing a strong item which cannot be obtained, for example, based on the beginner's own progress in the game thus far. On the other hand, even if another user participating in a multi-player mode is a beginner, an expert of the game may allow another user to become an effective fighting force by lending a strong item. Therefore, even if the user may be a beginner or an expert, the user can be given a motivation for performing multi-player. In addition, since the opportunities for the beginner and the expert to play multi-player are increased, communication between the beginners and the experts may be facilitated.

Although the invention may have been described with reference to the drawings and the embodiments, it should be noted that those skilled in the art can easily make various may change and modifications on the basis of the present disclosure. Therefore, it should be noted that these may change and modifications are within the scope of the invention. For example, functions and the like included in means, steps, or the like can be relocated so as not to be logically contradictory, and a plurality of the means, the steps, or the like may be combined into one or may be divided.

For example, in the above-described embodiment, the configuration where the first user may be a user of which association with the second game content may have not been established may have been described. Therefore, in the above-described embodiment, a plurality of the first users may exist simultaneously. For this reason, for example, in a case where a plurality of the first users want to borrow the same item, only the user who has transmitted the request for borrowing the item earlier may be able to borrow the item. In another embodiment, the server control unit 15 may select one user, which may be selected on the basis of information on two or more matched users from among the users of which association with the second game content may have not been established, as the first user. For example, on the basis of the history information included in the information on the user, the server control unit 15 determines one user having the smallest number of times of acquisition or the smallest acquisition frequency of the game content as the first user. According to such a configuration, in a case where game content a plurality of users have not established an association with the second game content, for example, the borrow request for borrowing items can be transmitted in order from the user having less acquisition experience of the game content, so that it may be possible to improve a sense of impartiality among the users.

In addition, in the above-described embodiment, it may be described that the first game part may be a game part in which a plurality of users cooperatively play a battle against a common opponent. However, the first game part may be a game part in which a plurality of users play a battle against each other. In such a case, since the users who play a battle against each other can lend and borrow items, for example, a difference in strength between the users who play a battle against each other may be reduced, so that the interest in the match may be improved.

In addition, in the above-described embodiment, the history information may include information on other users who borrowed items of the user and information on other users who lent items to the user. On the basis of the history information, the server control unit 15 may allow a GUI for receiving user operation for associating users with each other to be provided on the terminal devices 12 of the users who lent and borrowed the items. For example, the association between users may include one-way or two-way association between users, such as follow-up, followers, and friends in so-called SNS or the like. For example, in a case where the user A and the user B are associated with each other, in response to the request from the terminal device 12 of the user A, the server control unit 15 may transmit a request for participation to the user group including the user A to the terminal device 12 of the user B. Upon receiving information indicating approval of participation in the user group from the terminal device 12 of the user B, the server control unit 15 may add the user B to the user group. In this manner, since users associated with each other are easily included in the same user group, communication between the users can be facilitated.

In addition, for example, the server control unit 15 may determine the ranking such as the number of times of lending items or the number of times of borrowing items, for example, on the basis of the history information. In response to the request from the terminal device 12, the server control unit 15 may allow at least a portion of the determined ranking to be displayed on the terminal device 12. In addition, for example, in a case where the number of times of lending items or the number of times of borrowing items exceeds a predetermined value, the server control unit 15 may grant the user, for example, a game content or virtual coins as a reward, for example, on the basis of the history information. According to such a configuration, the user can be further given a motivation for performing multi-player.

In addition, in the embodiment described above, a configuration may have been described where, when the server control unit 15 receives the request for addition to the user group from the terminal device 12 of the user, the server control unit 15 may display the information on one or more user groups selected from among the plurality of user groups on the terminal device 12 of the user and the user may be allowed to select one of the user groups. Herein, the information on one or more user groups displayed on the terminal device 12 may include, for example, the information on each user included in each user group. In addition, for example, the information on one or more user groups may include the information on at least one item which can be associated with each user as the first game content excluding the item that may be the second game content of which association with each user included in each user group may be established. According to such a configuration, when allowing a user to select any one of the user groups, the user can be allowed to recognize borrowable items, so that the usability of the game may be improved.

Herein, when displaying the information on one or more user groups on the terminal device 12 of the user, the server control unit 15 may display the information on the user group including users who may have been lent and borrowed items with respect to the user in a mode different from a normal mode on the basis of the history information. The mode different from the normal mode may include any display mode that can be distinguished from the normal display mode such as a mode of displaying with changing display color or a mode of flashing display. According to such a configuration, since the user can recognize other users who lent and borrowed items in the past at a glance, the usability may be improved.

In addition, in the above-described embodiment, the terminal device 12 may execute a portion or all of the operations and processes executed by the server apparatus 11. Similarly, the server apparatus 11 may execute a portion of the operations executed by the terminal device 12. For example, processes such as display control of various screens displayed on the terminal device 12 and control of various GUIs may be executed by either the server apparatus 11 or the terminal device 12, and the server apparatus 11 and the terminal device 12 may be executed in cooperation.

In the above-described embodiment, a portion of various game screens may be displayed as a web display on the terminal device 12 on the basis of data generated by the server apparatus 11, and a portion of a game screen (for example, menu buttons are arranged in a header area and a footer area) displayed by a native application installed in the terminal device 12 may be displayed as a native display. In this manner, the game according to the above-described embodiment can be a hybrid game in which each of the server apparatus 11 and the terminal device 12 may be a portion of the processes.

In addition, in order to make it function as the server apparatus 11 or the terminal device 12 according to the above-described embodiment, an information processing device such as a computer or a cellular phone can be preferably used. Such an information processing device can be realized by storing, in a storage unit of the information processing device, a program describing contents of processes for realizing functions of the server apparatus 11 or the terminal device 12 according to the embodiment and by reading and executing the program by a CPU of the information processing device.

What is claimed is:

1. A non-transitory computer-readable storage medium comprising program code that, when executed, causes a server apparatus providing a game to a plurality of terminal devices used by a plurality of users to execute:
   a step of retrieving, for each user in the plurality of users, game content associated with said user, first game content associated with a first user in the plurality of users and second game content associated with a second user in the plurality of users;
   a selection providing step of providing, on a graphical user interface of a terminal device of the first user, a set of selectable game content comprising the first game content and second game content;
   a selection receiving step of receiving, from the set of selectable game content, a selection of first-user game content, the selection of first-user game content comprising second game content, and pairing the first-user game content with the first user;
   a step of executing a first game part common to the two or more users jointly for the two or more users, the first-user game content being associated with the first user during the first game part;
   a step of ending the first game part, and, as a result of ending the first game part, canceling the pairing between the first user and the second game content;
   a step of executing a second game part, the second game part including the first user and not including the second user;
   a step of enabling access, by the first user, after executing the second game part, based on the pairing between the first user and the second game content during the first game part, to the second game content within the game of the first user; and
   a step of, after enabling access to the second game content, providing the second game content to the first user.

2. The non-transitory computer-readable storage medium according to claim 1, wherein the step of providing the second game content to the first user comprises awarding to the first user, as a reward for the first game part, the second game content.

3. The non-transitory computer-readable storage medium according to claim 1, wherein the step of providing the second game content to the first user further comprises providing a further game content having a predetermined relationship with the second game content.

4. The non-transitory computer-readable storage medium according to claim 1, wherein the step of enabling access to the second game content comprises:
associating the second game content with a cost within the game, the cost comprising at least one of a game content or points within the game; and
enabling access to the second content by the first user after receiving payment of the cost from the first user.

5. The non-transitory computer-readable storage medium according to claim 1, wherein the step of executing the second game part is enabled based on cancellation of the pairing between the first user and the second game content.

6. The non-transitory computer-readable storage medium according to claim 5, wherein, upon cancellation of the pairing between the first user and the second game content, the server apparatus is configured to cause the terminal device of the first user to provide a selection prompt comprising an option to initiate the second game part, and configured to initiate the second game part upon selection of the option.

7. The non-transitory computer-readable storage medium according to claim 1, wherein the server apparatus is further configured to execute steps of:
tracking a play history of each user in the plurality of users, comprising tracking a number of times of acquisition of at least one game content by each user in the plurality of users; and
designating the first user as the first user, and providing the selection providing step, based on the first user having a lowest number of times of acquisition of the at least one game content.

8. The non-transitory computer-readable medium according to claim 1, wherein the server apparatus is further configured to execute steps of:
tracking a play history of the first user, comprising tracking a number of times of acquisition of the second game content; and
based on the pairing between the first user and the second game content during the first game part, updating the number of times of acquisition of the second game content.

9. The non-transitory computer-readable medium according to claim 1, wherein the server apparatus is further configured to execute steps of:
tracking a play history of each user in the plurality of users, comprising tracking both a number of times of acquisition of the at least game content by each user in the plurality of users and a frequency of acquisition of the at least one game content by each user in the plurality of users; and
designating the first user as the first user, and providing the selection providing step, based on a comparison between the frequency of acquisition of the at least one game content of the first user and the frequency of acquisition of the at least one game content of at least one other user.

10. The non-transitory computer-readable medium according to claim 1, wherein the server apparatus is further configured to execute steps of:
tracking a play history of each user in the plurality of users, comprising tracking login activity comprising at least one of a number of times each user has logged into the game and tracking a frequency with which each user has logged into the game; and
designating the first user as the first user, and providing the selection providing step, based on a comparison of the login activity of the first user and the login activity of at least one other user.

11. The non-transitory computer-readable medium according to claim 1, wherein the server apparatus is further configured to execute steps of:
identifying, for the first game part, an advantageous game content property;
determining at least one instance of game content having the advantageous game content property; and
providing, in the set of selectable game content, the at least one instance of game content having the advantageous game content property.

12. The non-transitory computer-readable storage medium according to claim 11, wherein each game content is associated with a game content attribute of a set of game content attributes; and
wherein the advantageous game content property is a particular game content attribute.

13. The non-transitory computer-readable storage medium according to claim 12, wherein the particular game content attribute is a weakness of at least one enemy character contained within the first game part.

14. The non-transitory computer-readable storage medium according to claim 12, wherein a character of the first user is associated with a character attribute, and wherein the particular game content attribute is a match to the character attribute.

15. The non-transitory computer-readable storage medium according to claim 14, wherein the server apparatus is further configured to execute a step of:
increasing or decreasing at least one parameter of the character of the first user based on the match between the particular game content attribute and the character attribute.

16. The non-transitory computer-readable storage medium according to claim 1, wherein the server apparatus is further configured to execute steps of:
while maintaining the pairing between the first user and the second game content, restricting the second user from using the second game content; and
after canceling the pairing between the first user and the second game content, ending restricting of the second user from using the second game content.

17. A method of providing a game, comprising causing a server apparatus configured to communicate with a plurality of terminal devices used by a plurality of users to execute:
a step of retrieving, for each user in the plurality of users, game content associated with said user, first game content associated with a first user in the plurality of users and second game content associated with a second user in the plurality of users;
a selection providing step of providing, on a graphical user interface of a terminal device of the first user, a set of selectable game content comprising the first game content and second game content;
a selection receiving step of receiving, from the set of selectable game content, a selection of first-user game content, the selection of first-user game content comprising second game content, and pairing the first-user game content with the first user;

a step of executing a first game part common to the two or more users jointly for the two or more users, the first-user game content being associated with the first user during the first game part;

a step of ending the first game part, and, as a result of ending the first game part, canceling the pairing between the first user and the second game content;

a step of executing a second game part, the second game part including the first user and not including the second user;

a step of enabling access, by the first user, after executing the second game part, based on the pairing between the first user and the second game content during the first game part, to the second game content within the game of the first user; and a step of, after enabling access to the second game content, providing the second game content to the first user.

18. The method of claim 17, further comprising steps of:

tracking a play history of each user in the plurality of users, comprising tracking acquisition information comprising at least one of a number of times of acquisition of at least one game content by each user in the plurality of users and a frequency of acquisition of the at least one game content by each user in the plurality of users; and designating the first user as the first user, and providing the selection providing step, based on a comparison of the acquisition information of the first user and the acquisition information of at least one other user.

19. A server apparatus configured to communicate with a plurality of terminal devices used by a plurality of users, the server apparatus comprising a processor and a memory, the memory storing program code that, when executed, causes the server apparatus to execute:

a step of retrieving, for each user in the plurality of users, game content associated with said user, first game content associated with a first user in the plurality of users and second game content associated with a second user in the plurality of users;

a selection providing step of providing, on a graphical user interface of a terminal device of the first user, a set of selectable game content comprising the first game content and second game content;

a selection receiving step of receiving, from the set of selectable game content, a selection of first-user game content, the selection of first-user game content comprising second game content, and pairing the first-user game content with the first user;

a step of executing a first game part common to the two or more users jointly for the two or more users, the first-user game content being associated with the first user during the first game part;

a step of ending the first game part, and, as a result of ending the first game part, canceling the pairing between the first user and the second game content;

a step of executing a second game part, the second game part including the first user and not including the second user;

a step of enabling access, by the first user, after executing the second game part, based on the pairing between the first user and the second game content during the first game part, to the second game content within the game of the first user; and a step of, after enabling access to the second game content, providing the second game content to the first user.

20. The server apparatus of claim 19, wherein the server apparatus is further configured to execute:

tracking a play history of each user in the plurality of users, comprising tracking acquisition information comprising at least one of a number of times of acquisition of at least one game content by each user in the plurality of users and a frequency of acquisition of the at least one game content by each user in the plurality of users; and designating the first user as the first user, and providing the selection providing step, based on a comparison of the acquisition information of the first user and the acquisition information of at least one other user.

* * * * *